United States Patent
Yamamoto et al.

(10) Patent No.: US 7,544,732 B2
(45) Date of Patent: Jun. 9, 2009

(54) MODIFIED FLUORORESIN COMPOSITION AND MODIFIED FLUORORESIN MOLDED ARTICLE

(75) Inventors: Yasuaki Yamamoto, Tokyo (JP); Etsuo Fukuchi, Tokyo (JP)

(73) Assignee: Hitachi Cable, Ltd., Tokyo (JP)

(*) Notice: Subject to any disclaimer, the term of this patent is extended or adjusted under 35 U.S.C. 154(b) by 188 days.

(21) Appl. No.: 11/235,542

(22) Filed: Sep. 27, 2005

(65) Prior Publication Data

US 2006/0270774 A1 Nov. 30, 2006

(30) Foreign Application Priority Data

May 25, 2005 (JP) .............................. 2005-152726

(51) Int. Cl.
*C08K 3/34* (2006.01)

(52) U.S. Cl. ...................................... 524/449; 524/520

(58) Field of Classification Search ................. 524/449, 524/520

See application file for complete search history.

(56) References Cited

U.S. PATENT DOCUMENTS

| 5,837,763 | A * | 11/1998 | Ferraro et al. ................ 524/449 |
| 7,241,829 | B2 * | 7/2007 | Chung et al. ................ 524/445 |
| 2002/0143094 | A1 * | 10/2002 | Conroy et al. ................ 524/445 |
| 2006/0199889 | A1 * | 9/2006 | Hunter et al. ................ 524/445 |
| 2007/0191525 | A1 * | 8/2007 | Kohno et al. ................ 524/445 |

FOREIGN PATENT DOCUMENTS

| JP | 2002-327068 | * | 11/2002 |
| JP | 2002-327068 | A | 11/2002 |
| JP | 2004-323683 | A | 11/2004 |
| JP | 2004-331814 | A | 11/2004 |

* cited by examiner

*Primary Examiner*—Peter D. Mulcahy
*Assistant Examiner*—Henry Hu
(74) *Attorney, Agent, or Firm*—Foley & Lardner LLP

(57) ABSTRACT

Unmodified fluororesin, modified fluororesin and mica are mixed to provide a modified fluororesin composition. The modified fluororesin composition is molded into a molded article having a predetermined shape. The modified fluororesin composition and the modified fluororesin composition molded article have excellent abrasion resistance in the water and hold original good properties of the fluororesin.

11 Claims, No Drawings

MODIFIED FLUORORESIN COMPOSITION AND MODIFIED FLUORORESIN MOLDED ARTICLE

The present application is based on Japanese Patent Application No. 2005-152726 filed on May 25, 2005, the entire contents of which are incorporated herein by reference.

BACKGROUND OF THE INVENTION

1. Field of the Invention

The present invention relates to a modified fluororesin composition and a modified fluororesin molded article, more particularly to a modified fluororesin composition and a modified fluororesin molded article having excellent abrasion resistance and durability in the water.

2. Description of the Related Art

Fluororesin has low friction properties and is excellent in heat resistance, electric properties, chemical resistance, and non-contamination properties (non-staining properties), so that such fluororesin is widely used in a variety of industrial and household applications, for instance, for machine parts such as gear, heat-resistant components or insulating materials.

However, the fluororesin exhibits remarkable abrasion and significant creep deformation under a sliding environment or a compression environment at a high temperature, and thus, there was a case where the fluororesin could not been applied.

As countermeasures for such disadvantage, a filler such as a glass fiber and a carbon fiber is added to the fluororesin, whereby properties of abrasion and creep deformation are improved.

According to the manner as mentioned above, however, there is a problem that such a reinforced fluororesin damages parts made from a soft metal such as aluminum wherein the parts are in a sliding condition with respect to a molded article made from the fluororesin.

On the other hand, as disclosed in Japanese Patent Laid-Open (Kokai) No. 2002-327068, it is attempted to obtain a sliding member having excellent abrasion resistance by modifying fluororesin itself by irradiation of radiation without adding any filler.

However, even in the method for reinforcing the fluororesin by adding the filler or by modifying the fluororesin itself, there is a disadvantage in that the abrasion resistance and the durability are not sufficient when the fluororesin is used in the water.

SUMMARY OF THE INVENTION

Accordingly, an object of the present invention is to provide a modified fluororesin composition and a fluororesin composition molded article having excellent abrasion resistance in the water and holding original good properties of the fluororesin.

As a result of various studies about the abrasion resistance of the fluororesin in the water, the Inventors found that the abrasion resistance in the water could be improved remarkably by using mica together with modified fluororesin composition, and a synergistic effect could be obtained thereby, and completed the present invention.

According to a first feature of the invention, a modified fluororesin composition, comprises:
a unmodified fluororesin;
a modified fluororesin prepared by applying radiation to the unmodified fluororesin; and
a layer silicate containing interlayer cations.

It is preferable that the layer silicate is mica.

The interlayer cations may be sodium ions.

It is preferable that a specific surface area of the mica is 1 $m^2/g$ or more.

Further, it is preferable that a sum weight of the modified fluororesin and mica is of 10 parts by weight to 70 parts by weight of the overall weight of the modified fluororesin composition, the modified fluororesin is of 5 parts by weight to 50 parts by weight of the overall weight of the modified fluororesin composition, and the mica is of 5 parts by weight to 20 parts by weight of the overall weight of the modified fluororesin composition.

It is preferable that the unmodified fluororesin comprises a tetrafluoroethylene-based polymer, containing 1 mol % or less of a fluoromonomer other than the tetrafluoroethylene-based polymer.

The unmodified fluororesin may be at least one member selected from the group consisting of
tetrafluoroethylene-based polymers,
tetrafluoroethyleneperfluoro(alkyl vinyl ether)-based copolymers, and
tetrafluoroethylenehexafluoropropylene-based copolymers.

It is preferable that the modified fluororesin has a heat of crystallization of 40 J/g or less, and a melting point of 325° C. or less.

The modified fluororesin may be prepared by applying ionizing radiation to the unmodified fluororesin heated at the melting point or a higher temperature under an inert gas atmosphere having an oxygen concentration of 10 torr or less within a range of irradiation doses of from 1 KGy to 10 MGy.

According to a second feature of the present invention, a modified fluororesin composition molded article, comprises:
a modified fluororesin composition molded into a predetermined shape;
wherein:
the modified fluororesin composition comprises:
a unmodified fluororesin;
a modified fluororesin preparedly applying radiation to the unmodified fluororesin; and
a layer silicate containing interlayer cations.

According to the present invention, it is possible to provide a modified fluororesin composition and a fluororesin composition molded article having excellent abrasion resistance in the water and holding original good properties of the fluororesin.

DESCRIPTION OF THE PREFERRED EMBODIMENTS

Next, a modified fluororesin composition and a modified fluororesin molded article in preferred embodiments of the present invention will be described in detail hereinafter.

A modified fluororesin composition according to the present embodiment comprises a mixture of (I) unmodified fluororesin, (II) modified fluororesin modified by applying irradiation of radiation to the unmodified fluororesin, and (III) mica. Each composition will be explained below in more detail.

(Unmodified Fluororesin)

An example of fluororesin to be employed as a unmodified fluororesin in the present invention includes: tetrafluoroethylene-based polymer (hereinafter, referred to as "PTFE"), tetrafluoroethylenefluoroalkoxytrifluoroethylene copolymer (hereinafter, referred to as "PFA"), tetrafluoroethylene-hexafluoropropylene copolymer (hereinafter, referred to as "FEP"), and polytetrafluoroethyleneperfluorodioxythol (hereinafter, referred to as "THF/PDD").

The above described includes also those containing 1 mol % or less, more preferably 0.2 mol % or less of a polymeric unit derived from a copolymerizable monomer such as perfluoro(alkyl vinyl ether), hexafluoropropylene, (perfluoroalkyl)ethylene, and chlorotrifluoroethylene. Furthermore, the fluororesin in the above-described copolymeric form may contain a small amount of a third component in their molecular structure.

(Modified Fluororesin)

Modified fluororesin (molded article) in the present invention may be prepared by applying the ionizing radiation to the unmodified fluororesin (molded article) which is in a state wherein it is heated at the melting temperature or a higher temperature under an inert gas atmosphere having an oxygen concentration of 10 Torr or less within a range of an irradiation dose of from 1 KGy to 10 MGy. An example of the ionizing radiation to be used includes γ rays, electron rays, X rays, neutron radiation and high-energy ions, etc.

In case of applying ionizing radiation, it is preferable to heat the unmodified fluororesin (molded article) at its crystalline melting point or a higher temperature. When a PTFE is used as a fluororesin material, it is required to expose ionizing radiation to the unmodified fluororesin material which is under a heating condition at a higher temperature than 327° C. being the melting point of the fluororesin material. In case of employing a PFA or an FEP, it is required to expose such a material to ionizing radiation under a heating condition, wherein the former PFA is heated at its melting point of 310° C. or a higher temperature, while the latter FEP is heated at its melting point of 275° C. or a higher temperature.

To heat the fluororesin at its melting point or a higher temperature means to activate molecular motion of backbone chains, which constitute the fluororesin, whereby it becomes possible to efficiently accelerate cross-linking reactions among molecules. However, excessive heating brings about adversely cutting and decomposition of the molecular backbone chains. Accordingly, a heating temperature should be limited to a range wherein it is 10 to 30° C. higher than a melting point of fluororesins in view of suppressing an occurrence of such a depolymerizing phenomenon.

It is preferable that the modified fluororesin used in the present invention have a melting point of 325° C. or less and a heat of crystallization of 40 J/g or less. In concrete, when PFA is used as the fluororesin, it is preferable that a melting point of the PFA is 305° C. or less, and a heat of crystallization is 26 J/g or less., and when FEP is used as the fluororesin, it is preferable that a melting point of the FEP is 275° C. or less, and a heat of crystallization is 11 J/g or less.

For estimating the above-described thermal properties, a Differential Scanning Calorimeter (DSC) is used. Temperature rise and temperature descent of the fluororesin are repeated two times, respectively, per 10° C./min within a range of from 50 to 360° C. to determine an endothermic peak temperature of a DSC curve in a second temperature rise as a melting point. A heat of crystallization is determined from a peak area surrounded by the exothermic peak in a second temperature descent and a base line in accordance with JIS K7122.

(Mica)

Mica includes natural mica and synthetic mica. The former natural mica includes phlogopite ($KMg_3AlSi_3O_{10}OH_2$), dolomite ($KAl_3Si_3O_{10}OH_2$), etc. The latter synthetic mica includes fluorine-phlogopite ($KMg_3AlSi_3O_{10}F_2$), K-tetrasilicic mica ($KMg_{2.5}Si_4O_{10}F_2$), Na-tetrasilicic mica ($NaMg_{2.5}Si_4O_{10}F_2$), etc.

The synthetic mica is a layer silicate having an alternate layer structure in which silicate layers having a 2:1 type structure and layers composed of alkali or alkaline earth ions are laminated. In the respective 2:1 type silicate layer, two layers of $SiO_2$ tetrahedrons share oxygen, and a $Mg(OH)_2$ or $Al(OH)_3$ octahedrons layer is sandwiched by the $SiO_2$ tetrahedrons layers. In case where interlayer cations are potassium ions, such synthetic mica does not expand in the water (non-expandable mica) similarly to the natural mica. In case where the interlayer cations are sodium or lithium ions, ionization tendency is small, so that the bonding between the silicate layer and interlayer cations is weaker than that in the natural mica. Accordingly, such synthetic mica expands in the water and other polar solvent, and disperses in the water to form sol-gel (expandable mica).

For the mica, both of the natural mica and synthetic mica can be employed. In particular, by using the synthetic mica modified fluororesin, the abrasion resistance in the water can be remarkably improved. Nevertheless the detailed reason is not ensured, however, it is assumed that the significant improvement in abrasion resistance is brought by the synergic effect of following functions: (I) bonding force between crystalline layers of the mica is small so that the mica takes moisture molecules easily, (II) hydrophilic force of sodium ions is strong so that the mica takes moisture molecules and the hydration occurs easily and functions as lubricant, and (III) abrasion resistance in the water of the modified fluororesin itself is improved.

In addition, it is desirable that a specific surface area of the mica is more than 1 $m^2/g$ so as to largely improve the abrasion resistance in the water. This is based on the following reason. When the specific surface area of the mica is greater than this value, water absorption property is largely increased and the abrasion resistance in the water becomes remarkably high. Further, when the specific surface area of the mica is greater than this value, an abrasion resistance in the dry inside is greatly improved. Herein, a "Specific surface area" is a value of a surface area per unit weight, which is calculated by using the BET (Brunauer-Emmett-Teller) equation based on a nitrogen adsorption isotherm in a liquid nitrogen temperature. The specific surface area can be measured by using a Micromeritics Automatic Surface Area Analyzer Gemini 2360, 2375, etc. of Shimadzu Corporation.

(Compound Ratio)

Concerning a compound ratio, it is preferable that a sum weight of modified fluororesin and mica is of 10 parts by weight to 70 parts by weight of the overall weight of the modified fluororesin composition, a modified fluororesin is of 5 parts by weight to 50 parts by weight of the overall weight of the modified fluororesin composition, and a mica is of 5 parts by weight to 20 parts by weight of the overall weight of the modified fluororesin composition. If each weight is less than the above-described ranges, it will be difficult to provide a large improvement in the abrasion resistance in the water. In addition, if each weight is greater than the above-described ranges, mechanical characteristics such as tensile strength will be remarkably decreased.

(Application and Effect)

Since the above explained modified fluororesin composition is excellent in abrasion resistance and creep resistance, a wide variety of applications of the such as a sliding member, sealing member, packing, gasket, and a container, jig, and pipe for manufacturing a semiconductor can be expected.

Further, it is suitable for application in the water, since the modified fluororesin composition can provide an excellent abrasion resistance in the water. Still further, a member frictionized with the modified fluororesin is hard to be damaged, and a color is white. Therefore, the modified fluororesin according to the present invention contributes greatly to broaden a variety of applications of the fluororesin. In a like manner, a molded article formed of this modified fluororesin composition can be applied to a molded article to be used in the water.

In addition, in this preferred embodiment, an example where mica is added to the unmodified fluororesin and modified fluororesin is explained. Instead of the mica, layer silicate such as natural smectite, e.g. montmorillonite $(Na_{0.33}Mg_{0.33}Al_{1.67}Si_4O_{10}(OH)_2)$, and synthetic smectite, e.g. Na-hectorite $(Na_{0.33}Mg_{2.67}Li_{0.33}Si_4O_{10}(OH)_2$, $Na_{0.33}Mg_{2.67}Li_{0.33}Si_4O_{10}F_2)$, Li-hectorite $(Li_{0.33}Mg_{2.67}Li_{0.33}Si_4O_{10}(OH)_2$, $Li_{0.33}Mg_{2.67}Li_{0.33}Si_4O_{10}F_2)$, saponite $(Na_{0.33}Mg_{2.67}AlSi_4O_{10}(OH)_2)$, etc. can be used.

In addition, it is possible to elevate lubricity by adding solid lubricant such as molybdenum disulfide, graphite or the like as a component other than fluororesin, modified fluororesin and layer silicate.

EXAMPLES

In the following, the present invention will be specifically described and advantageous effects of the invention are also demonstrated on the basis of a comparison of the explained below in more detail according to embodiments and comparative examples.

Firstly, a compound having a composition shown in table 1 was prepared.

For PTFE, PTFE powder (Trade name: P-192 manufactured by Asahi Glass Co., Ltd.) was used. This PTFE powder was exposed to electron beam (accelerating voltage of 2 MeV) of an irradiation dose of 100 kGy at a heating temperature of 340° C. in an oxygen concentration of 1 torr under nitrogen atmosphere. The resulting modified fluororesin powder was pulverized in a jet mill until an average particle diameter thereof reached about 20 μm.

In addition, for mica, three kinds of mica were used: mica 1 (Trade name: Somasif ME-100 manufactured by Co-op Chemical Co., Ltd., average particle diameter of 7 μm, specific surface area of 9 m²/g), mica 2 (Trade name: Micromica MK-100 manufactured by Co-op Chemical Co., Ltd., average particle diameter of 7 μm, specific surface area of 3 m²/g), and mica 3 (average particle diameter of 10 μm, specific surface area of 0.5 m²/g). Carbon fiber having a fiber diameter of 1 μm, a fiber length of 10 μm, an aspect ratio of 10, and molybdenum disulfide (Trade name: Molykote Z manufactured by Dow Corning Co., Ltd.) were used.

TABLE 1

| Composition | Composition (weight parts) | | | | | | | | | | |
|---|---|---|---|---|---|---|---|---|---|---|---|
| | Examples | | | | | | | | Comparative examples | | |
| | 1 | 2 | 3 | 4 | 5 | 6 | 7 | 8 | 1 | 2 | 3 |
| PTFE | 92 | 30 | 80 | 80 | 70 | 50 | 70 | 80 | 80 | 85 | 70 |
| Modified PTFE | 5 | 40 | 15 | 10 | 20 | 39 | 20 | 10 | 20 | | 20 |
| Mica 1 | 3 | 30 | 5 | 10 | 10 | 10 | | | | 15 | |
| Mica 2 | | | | | | | 10 | | | | |
| Mica 3 | | | | | | | | 10 | | | |
| Carbon fiber | | | | | | | | | | | 10 |
| Molybdenum disulfide | | | | | 1 | | | | | | |

Mica 1: Somasif ME-100 manufactured by Co-op Chemical Co., Ltd., average particle diameter of 7 μm, specific surface area of 9 m²/g
Mica 2: Micromica MK-100 manufactured by Co-op Chemical Co., Ltd., average particle diameter of 7 μm, specific surface area of 3 m²/g
Mica 3: average particle diameter of 10 μm, specific surface area of 0.5 m²/g
Carbon fiber: fiber diameter of 1 μm, fiber length of 10 μm, and aspect ratio of 10
Molybdenum disulfide: Molykote Z manufactured by Dow Corning Co., Ltd.

These materials were blended with a mixer at a material temperature and an environmental temperature of 15° C. in formulation compositions indicated in the TABLE 1. These compounds are molded into molded articles by using hot forming method. A metal mold having a diameter of 45 mm and a height of 80 mm was charged with each of the resulting compounds, and pressed for five minutes under a pressure of 50 MPa at a normal temperature, to compression-mold compound. Then, the resulting product in all the examples and comparative examples was calcinated at a temperature of 360° C. for two hours under an atmospheric pressure. Thereafter, the resulting product contained in a metal mold was taken out at the normal temperature, and compression-molded under a molding pressure of 20 MPa to prepare a rod. The rods thus prepared were cut out with a predetermined length to obtain test pieces.

Next, evaluations on characteristic properties of samples will be described. Tests were conducted three times per sample, and an average value was determined by arithmetical mean from the results measured of the samples.

(Evaluation on Abrasion Resistance Properties)

A ring-on-disk type friction and abrasion testing machine was used for test based on JIS K7218 wherein a test specimen. (an outer diameter of 25.6 mm, an inner diameter of 20.6 mm, and a thickness of 1 mm) was bonded to a cylindrical ring specimen (an outer diameter of 25.6 mm and an inner diameter of 20.6 mm) made of SUS 304. The tests were conducted with a member to be frictionized with the test specimen, wherein the member is made of SUS 304 plate (a length of 30 mm, a width of 30 mm, a thickness of 5 mm, and a surface roughness Ra of 0.2 μm) at a rate of 125 m/min under a pressure of 0.4 MPa. The atmosphere is in the water and ion-exchanged water is used for the test at a temperature of 20° C.

After the lapse of 24 hours, decrease in a weight of a test specimen was measured, and a specific abrasion quantity $V_{SA}$ was determined from the following formula:

$$V_{SA} = V/(P \cdot L)$$

wherein V is abrasion quantity, P is test load, and L is average sliding distance.

Further, concerning damages in the member to be frictionized with the test specimen, a surface roughness of the member to be frictionized is measured after the test by using a contact-type surface roughness tester (Trade name: SE-3500, manufactured by Kosaka Seisakusho, Co., Ltd.). A test specimen having a damaged track of 5 μm or more in depth after the test is determined as "damaged", and a test specimen having a damaged track less than 5 μm in depth after the test is determined as "non-damaged".

The results of properties are shown in the following TABLE 2.

TABLE 2

| Properties Sliding properties | Results of properties | | | | | | | | | | |
|---|---|---|---|---|---|---|---|---|---|---|---|
| | Examples | | | | | | | | Comparative examples | | |
| | 1 | 2 | 3 | 4 | 5 | 6 | 7 | 8 | 1 | 2 | 3 |
| Specific Abrasion Quantity (×10⁻⁸ mm³/Nm) | 1100 | 910 | 95 | 60 | 35 | 8 | 510 | 990 | 3000 | 2300 | 1900 |
| Coefficient of Friction | 0.21 | 0.15 | 0.15 | 0.16 | 0.17 | 0.12 | 0.15 | 0.18 | 0.19 | 0.23 | 0.17 |
| Damages in Member to be frictionized with Test specimen | No | No | No | No | No | No | No | No | No | No | Yes |

From the results of properties shown in TABLE 2, it was understood that all the molded articles prepared from a composition mainly composed of PTFE, modified PTFE and mica according to the present examples exhibited low specific abrasion quantity and coefficient of friction, and excellent abrasion resistance in the water. Further, the member frictionized with the test specimen in each of the present examples was not damaged.

On the other hand, all the molded articles obtained in comparative examples 1 and 2 containing only either one of modified fluororesin and mica exhibited large specific abrasion quantity and poor abrasion resistance. Further, it was understood that the molded article obtained in comparative example 3 containing filler other than the fillers according to the present examples has poor abrasion resistance and damaged the member frictionized with the test specimen.

As in apparent from the comparison of the above-described examples with comparative examples, the molded articles according to the present examples can provide excellent abrasion resistance in the water and they can suppress damages of the member to be frictionized with the sliding member.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A modified fluororesin composition, consisting essentially of:
    (a) an unmodified fluororesin;
    (b) a modified fluororesin prepared by applying radiation to the unmodified fluororesin of (a); and
    (c) a layer silicate containing interlayer cations consisting essentially of sodium ions.

2. The modified fluororesin composition, according to claim 1, wherein:
    the layer silicate comprises mica.

3. The modified fluororesin composition, according to claim 2, wherein:
    a specific surface area of the mica is 1 m²/g or more.

4. The modified fluororesin composition, according to claim 2, wherein:
    a sum weight of the modified fluororesin and mica is of 10 parts by weight to 70 parts by weight of the overall weight of the modified fluororesin composition, the modified fluororesin is of 5 parts by weight to 50 parts by weight of the overall weight of the modified fluororesin composition, and the mica is of 5 parts by weight to 20 parts by weight of the overall weight of the modified fluororesin composition.

5. The modified fluororesin composition, according to claim 1, wherein:
    the unmodified fluororesin comprises a tetrafluoroethylene-based polymer containing 1 mol % or less of a fluoromonomer other than the tetrafluoroethylene-based polymer.

6. The modified fluororesin composition, according to claim 1, wherein:
    the unmodified fluororesin comprises at least one member selected from the group consisting of
    tetrafluoroethylene-based polymers,
    tetrafluoroethyleneperfluoro(alkyl vinyl ether)-based copolymers, and
    tetrafluoroethylenehexafluoropropylene-based copolymers.

7. The modified fluororesin composition, according to claim 1, wherein:
    the modified fluororesin has a heat of crystallization of 40 J/g or less, and a melting point of 325°C. or less.

8. The modified fluororesin composition, according to claim 1, wherein:
    the modified fluororesin is prepared by applying ionizing radiation to the unmodified fluororesin heated at the melting point or a higher temperature under an inert gas atmosphere having an oxygen concentration of 10 torr or less within a range of irradiation doses of from 1 KGy to 10 MGy.

9. The modified fluororesin composition, according to claim 1, wherein:
    the unmodified fluororesin comprises a tetrafluoroethylene-based polymer containing 1 mol % or less of a copolymerizable fluoromonomer.

10. The modified fluororesin composition, according to claim 9, wherein the copolymerizable fluoromonomer is selected from the group consisting of a perfluoro(alkyl vinyl ether), hexafluoropropylene, and chlorotrifluoroethylene.

11. The modified fluororesin composition, according to claim 1, wherein the modified fluororesin composition exhibits improved abrasion resistance in water.

* * * * *